United States Patent [19]

Nikitin et al.

[11] 4,054,501

[45] Oct. 18, 1977

[54] METHOD AND APPARATUS FOR REMOVAL OF MECHANICAL IMPURITIES FROM DIELECTRIC FLUIDS

[76] Inventors: Gennady Andreevich Nikitin, ulitsa Garmatnaya, 57, kv. 24; Konstantin Vasilievich Nikonov, ulitsa Zodchikh, 6^a, kv. 132; Gennady Pavlovich Karabtsov, ulitsa Avtozavodskaya, 25, kv. 40, all of Kiev, U.S.S.R.

[21] Appl. No.: 727,715

[22] Filed: Sept. 29, 1976

[51] Int. Cl.² ........................ B03C 5/00; B01D 13/02

[52] U.S. Cl. ........................ 204/186; 204/302

[58] Field of Search ........................ 204/302-308, 204/186, 275, 184, 188

[56] References Cited

U.S. PATENT DOCUMENTS

| | | | |
|---|---|---|---|
| 3,415,735 | 12/1968 | Brown et al. | 204/302 |
| 3,484,362 | 12/1969 | Van Vroon Hoven | 204/302 |
| 3,766,050 | 10/1973 | Pados | 204/302 |

*Primary Examiner*—T. M. Tufariello

*Attorney, Agent, or Firm*—Steinberg & Blake

[57] ABSTRACT

A method of removing mechanical impurities from dielectric fluids resides in that a fluid being treated is caused to flow across an electric field in a direction substantially perpendicular to the collection surfaces of electrodes which create the electric field. An apparatus for the removal of mechanical impurities from dielectric fluids comprises a hollow housing having an inlet and outlet openings for the fluid to pass therethrough. Mounted within said housing is a stack of electrodes which are alternately connected to the positive and negative terminals of a DC power source. Each of the electrodes has through openings made therein, and the electrode stack is arranged within the housing so that the fluid being treated is allowed to pass through said openings in the electrodes. The method and apparatus ensure more efficient contaminant removal as compared to the prior art systems. The herein proposed system may be advantageously used for treating jet and internal-combustion engine fuels as well as hydraulic fluids and lubricant oils.

8 Claims, 2 Drawing Figures

METHOD AND APPARATUS FOR REMOVAL OF MECHANICAL IMPURITIES FROM DIELECTRIC FLUIDS

The present invention relates to treatment of fluids, and more particularly to a method of and an apparatus for the removal of mechanical impurities from dielectric fluids.

This invention may find application in fine treatment of dielectric fluids such as jet fuel, or fuel for internal-combination engines, hydraulic fluids and lubricants.

Known in the prior art is a method of removing mechanical impurities from dielectric fluids by causing the fluid being treated to flow across an electric field created by electrodes.

According to this method, the fluid being treated is caused to flow in a direction substantially parallel to the collection surfaces of the electrodes.

There is also known an apparatus for carrying out the above-mentioned method of removing mechanical impurities from dielectric fluids (cf. U.S. Pat. No. 3,445,376 Cl. 204-302, 1969), which comprises a housing provided an with inlet and outlet openings for the fluid being treated to pass therethrough, a stack of electrodes being arranged within said housing alternately connected to the positive and negative terminals of a high voltage DC power source.

In the known apparatus, the electrode assembly is arranged within the housing so that the fluid being purified is directed to flow across the inter-electrode space substantialy parallel to the collection surfaces of the electrodes which form an electric field.

The electric field causes the charged particles of the mechanical impurities contained in the fluid being treated to travel to the collection surface of the electrodes and accumulate thereupon in the form of a precipitate.

In order to better retain this precipitate, the inter-electrode space is filled, partially or completely, with a dielectric porous material such as Porolon, for example.

A major disadvantage of the above-mentioned method and apparatus for the removal of impurities from dielectric fluids lies in that the fluid being treated is caused to flow across the inter-electrode space substantially parallel to the collection surfaces of the electrodes. As a result of this, the particles of impurities which settle upon the electrodes are exposed to the force of the flowing fluid. Thus, a part of these particles may be entrained by the outflowing fluid, which affects the quality. It also decreases the conminant capacity of the apparatus.

The term "contaminant capacity" as used herein refers to the amount of mechanical impurities accumulated in the apparatus beyond which the specified performance characteristics thereof start to deteriorate.

Besides, in view of the fact that the fluid being treated passes through a porous material, the hydraulic resistance increases in the prior art apparatus, hence more power is consumed to make the fluid flow. The use of a porous material results in an unreasonable increase in the dimensions and weight of the apparatus.

It should be borne in mind that the regeneration of the prior art apparatus for the removal of impurities from dielectric fluids in a labour-consuming operation. It usually includes partial disassembly of the apparatus and rinsing thereof, as well as replacing some of its elements, such as Porolon gaskets, etc.

It is an object of the present invention to obviate the above disadvantages.

The present invention is aimed at the provision of a method of and an apparatus for the removal of mechanical impurities from dielectric fluids, which method and apparatus will make it possible to effectively retain the particles of impurities at the collection surfaces of electrodes, hence higher efficiency of contaminant removal, increased contaminant capacity of the apparatus and its lower hydraulic resistance.

These and other objects of the invention are accomplished in a method of removing mechanical impurities from dielectric fluids, residing in that the fluid being treated is caused to flow accross an electric field, according to the invention, in a direction substantially perpendicular to the collection surfaces of the electrodes.

These objects are likewise attained in an apparatus for carrying out the above method, which comprises a hollow housing having an inlet and outlet openings for the fluid being treated to pass therethrough, and accommodating a stack of electrodes which are alternately connected to the positive and negative terminals of high voltage DC power source, said electrodes, according to the invention, being provided with through openings, the entire stack of electrodes being arranged within the housing so as to allow the fluid being treated to pass through said openings in the electrodes.

From the foregoing, it will be apparent that it is possible to bring down the flow rate of the fluid being treated while it is passing along the collection surfaces of the electrodes, thereby minimizing the forces detaching the particles of mechanical impurities already settled on the collection surfaces of the electrodes, which results in a smaller amount of said particles being entrained by the outflowing fluid.

The aforecited advantages of the herein proposed method and apparatus for the removal of mechanical impurities from dielectric fluids ensure higher quality of treatment, much higher impurity accumulation capacity of the apparatus, and lower hydraulic resistance thereof.

It is expedient that the adjacent electrodes be arranged with their openings facing each other, and that longitudinal partitions from a dielectric material be arranged in the inter-electrode spaces so that longitudinal channels are formed in the stack of electrodes with transverse recesses between the electrodes, wherein the particles of mechanical impurities accumulated in the course of treatment.

The longitudinal partitions in the inter-electrode spaces prevent the fluid being treated from flowing along the collection surface of the electrodes, making it possible to retain thereupon the particles of mechanical impurities caught in the deep transverse recesses of the longitudinal channels.

The invention will now be explained in greater detail with reference to an embodiment thereof, taken in conjunction with the accompanying drawings, wherein.

Figure 1:
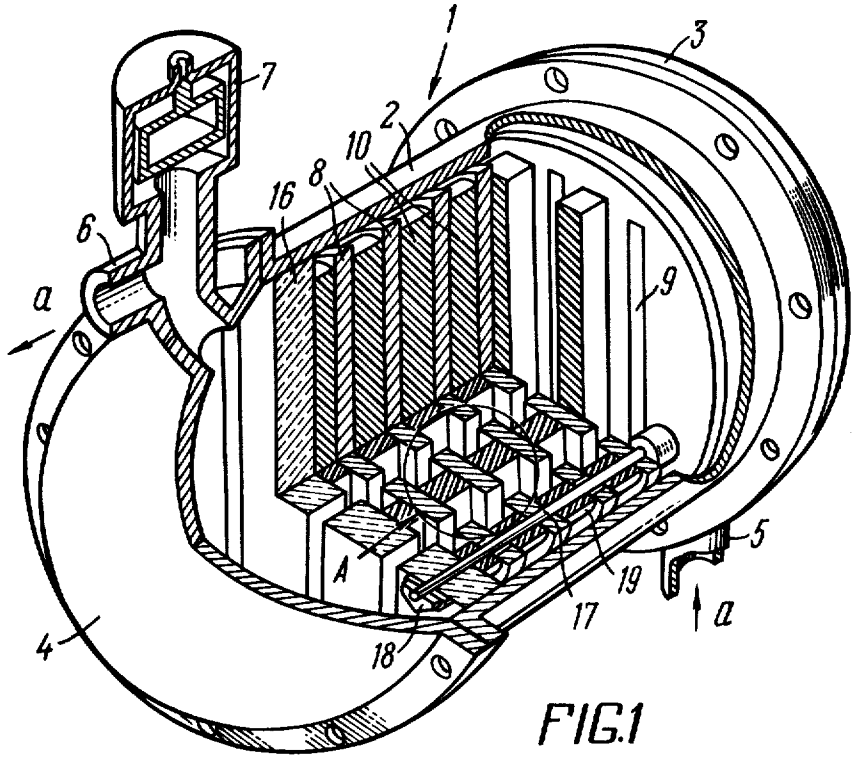
FIG. 1 is a schematic partially cut perspective view of an apparatus for the removal of mechanical impurities from dielectric fluids.

The proposed method of removing mechanical impurities from dielectric fluids resides in that the fluid being treated is caused to flow in a uniform electric field created by electrodes.

According to the invention, the fluid being treated is substantially perpendicular to the collection surfaces of the electrodes.

As a result, the particles of mechanical impurities, which have already settled on the collection surfaces of the electrodes, are not entrained by the outflowing fluid being treated.

This occurs due to the fact that the settled contaminant particles are not in the way of the main fluid flow and are, therefore, subjected to a far weaker force of the fluid flow as compared with the instance when the same fluid flows in a direction substantially parallel to the collection surfaces of the electrodes.

According to the above method of the invention, the apparatus for the treatment of dielectric fluids comprises a hollow airtight housing 1 (FIG. 1), having a cylinder-shaped drum 2 with flanges attached whereto are covers 3 and 4.

The cover 3 is provided with an inlet opening (not shown) wherethrough the housing 1 communicates with an inlet pipe 5 for the passage of the fluid to be treated.

The cover 4 is provided with an outlet opening wherethrough the housing 1 communicates with an outlet pipe 6 for the passage of the purified fluid into a container (not shown).

Mounted within the housing 1, in its cylinder-shaped drum 2, is a stack of flat electrodes 8 in the form of discs, made from an electrically conducting material, which are arranged parallel to one another.

The electrodes 8 are alternately connected, in the course of operation, to the positive and negative terminals of high voltage DC power source (not shown).

According to the invention, each electrode has through openings 9 made therein, and the entire stack of electrodes is arranged within the housing 1 so that the fluid being purified passes through the openings 9 in the electrodes 8. Openings 9 are made in the form of parallel slots, the openings in adjacent electrodes 8 facing each other.

Arranged in the interspace between adjacent electrodes 8, substantially midway between the opposite openings 9, are longitudinal partitions 10 made from a dielectrical material, such as insulating rubber.

The partitions 10 together with the electrodes 8 and the openings 9 therein form longitudinal channels 11 (FIG. 2) with transverse recesses 12 therein, each recess being formed by a collection surface 13 of two adjacent electrodes 8 and by the longitudinal partition 10 therebetween. As the fluid being treated passes through the channels 11, particles 14 of mechanical impurities collect in the recesses 12 defined by the collection surfaces 13 of the electrodes 8.

It has been found that the relationship between the width "$\sigma$" of the longitudinal channels 11 and interspace "$b$" between the electrodes 8 should be in the range of from 0.6 to 1.5, and the relation of value "$h$" of the transverse recess 12 in the channel 11 to the interspace "$b$" between the electrodes 8 should range from 0.6 to 1.2.

It is expedient that at least every other collection surface 13 of the electrodes 8, as well as the surfaces of the openings 9 be coated with a layer 15 of a dielectric material such as insulating varnish, which will preclude recharging of the deposited particles 14 and short circuiting of the electrodes 8.

The stack of electrodes 8 is confined at both ends by discs 16 (FIG. 1) made from a dielectric material, which act as means for centering the stack in the drum 2 of the apparatus housing 1.

The stack of electrodes 8 with the partitions 10 and centering discs 16 are tightened by at least two studs 17 with nuts 18.

Fitted on the studs 17, in the interspace between the electrodes 8, are washers 19 made of a dielectric material, the thickness of said washers being equal to that of the longitudinal partitions 10.

Simultaneously, the two studs 17 serve as lead-ins through which the electrodes are energized one of the studs being connected to the positive terminal and the other to the negative terminal of the high voltage DC power source. Each electrode 8 has two circular openings with different diameters, the diameter of the smaller opening in the electrode 8 being equal to that of the stud 17, which makes it possible to establish electrical contact therebetween.

Alternation of oppositely charged electrodes 8 is provided in the course of assembly of the electrode stack.

The apparatus for the treatment of dielectric fluids operates as follows.

Prior to treatment, the apparatus should be installed so that the outlet opening in the cover 4 of the housing 1 would take the extreme upper position to allow the fluid to be treated to fill up the housing 1.

The fluid being treated is pumped (the pump is not shown) through the inlet pipe 5 and through the inlet opening in the cover 3 of the housing 1 into the latter, which fluid, after having passed through the channels 11 in the stack of electrodes 8, flows from the housing 1 through the outlet opening and outlet pipe 6 in the cover 4 of the housing 1, and out into a container.

Figure 2:
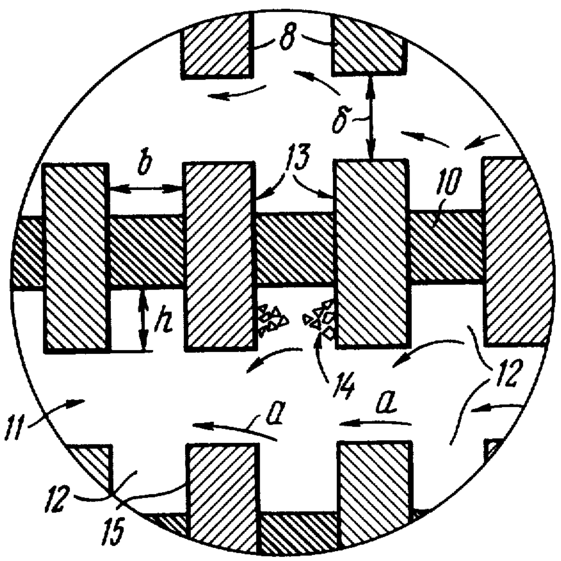
FIG. 2 is an enlarged view of portion "A" in FIG. 1.

The fluid flow direction in the apparatus is shown in FIGS. 1 and 2 by arrows "a."

With the spacing of the housing 1 being filled up with the fluid being treated, the electrodes 8 are energized from the DC power source. Therewith, a potential difference is established between adjacent electrodes 8, and a non-uniform electric field is created in the longitudinal channels 11. The electric field causes the charged particles 14 of mechanical impurities, contained in the fluid being treated (during the fluid flow through the longitudinal channels 11), to get into the recesses 12 of the channels 11 between the electrodes 8, which particles then settle on the collection surfaces 13.

The coating layer 15 of a dielectric material on the collection surface 13 of the electrodes 8 precludes recharging of the deposited particles 14 of mechanical impurities and short circuiting of the electrodes 8.

As is apparent from the above description, the spaced flat electrodes 8 define at their openings 9 and at the spaces between these openings 9 a continuous unobstructed path of flow for the fluid which is to be treated. The surfaces 13 of the spaced electrodes 8 extend laterally from edges of the openings 9 so that each surface 13 of one electrode 8 defines with the surface 13 of the next electrode 8 the collection recess 12 extending laterally from and communicating with the unobstructed path of flow 11 for the fluid which is to be treated, the partitions 10 of course forming the innermost parts of the collection recesses 12.

In view of the fact that the deposition of particles 14 of mechanical impurities (contaminants) occurs in deep recesses 12 of the channels 11, the possibility that these particles will be entrained by the main flow of the fluid being treated is practically nil. This feature enhances the efficiency of the contaminant removal process, and may be regarded as a major advantage of this invention.

Besides, the great number of deep transverse recesses 12 in the channels 11 of the stack of electrodes 8 accounts for higher contaminant capacity of the apparatus, while the increased cross-sectional dimensions of the longitudinal channels 11 reduce its hydraulic resistance.

The high efficiency of the contaminant removal process, as well as high contaminant capacity of the apparatus result in smaller dimensions and weight of the apparatus for the removal of impurities from dielectric fluids, while its low hydraulic resistance permits installation of such apparatus in suction lines of pumping plants.

It is to be noted that testing of the proposed apparatus has revealed the absolute fineness of purification process is equal to 2 microns, and the contaminant concentration per pass in a fluid, for example, in kerosene, has been brought down from 90 to 0.5 mg/1.

What is claimed is:

1. A method of removing mechanical impurities from dielectric fluids, residing in that the fluid being treated is caused to flow in an electric field along an unobstructed path defined in part by openings in a series of spaced flat electrodes and in part by spaces between said openings, said electrodes having collection surfaces extending laterally from edges of said openings thereof with the collection surface of one electrode facing the collection surface of the next electrode to define therewith a collection chamber for the mechanical impurities communicating with and extending laterally from the unobstructed path of fluid flow, the latter being in a direction substantially perpendicular to the collection surfaces of said electrodes which create said electric field.

2. An apparatus for the removal of mechanical impurities from dielectric fluids, comprising: a hollow housing having an inlet opening and an outlet opening for the fluid being treated to pass therethrough; a stack of flat electrodes spaced from each other and mounted within said housing, said electrodes being formed with through openings and being arranged with unobstructed spaces between said openings so that the latter and said spaces define in said housing a continuous unobstructed path of fluid flow for the fluid being treated, said electrodes being alternately connected to the positive and negative terminals of a high voltage DC power source; said electrode stack being arranged in said housing so that the fluid being treated is allowed to pass through said openings in said electrodes, and said spaces therebetween along said unobstructed path, said electrodes having collection surfaces extending laterally from edges of said openings with the collection surface of one electrode defining with the collection surface of the next electrode a collection chamber which communicates with and extends laterally from the unobstructed path of fluid flow and which results in deposition of the contaminant particles, contained in the fluid being treated, on the collection surfaces of said electrodes, which are not in the way of the fluid flow, whereby said particles are not entrained by the outflowing fluid.

3. An apparatus as claimed in claim 2, wherein said through openings in said adjacent electrodes are disposed one opposite the other, and positioned in the interspaces between said electrodes at the innermost parts of said collection chambers are partitions of a dielectric material, said partitions being arranged so that longitudinal channels are formed in said electrode stack with transverse recesses between said electrodes, forming said collection chambers, in which recesses said particles of mechanical impurities settle in the course of fluid treatment.

4. An apparatus as claimed in claim 2, wherein at least some of said collection surfaces are covered with a coating layer of a dielectric material to preclude recharging of the deposited particles and short circuiting of the electrodes.

5. An apparatus as claimed in claim 2, wherein said collection chambers have hollow interiors which also are free and unobstructed so substantially the entire volume of said hollow interiors of said collection chambers are available for deposition of the particles.

6. An apparatus as recited in claim 2, wherein said hollow housing has opposed ends where said inlet and outlet openings are respectively situated, and said hollow housing having a central axis extending between said opposed ends thereof, said flat electrodes extending normal to said axis across the interior of said hollow housing.

7. An apparatus as claimed in claim 6, wherein said openings are in the form of elongated slots in said flat electrodes.

8. An apparatus as claimed in claim 7, wherein said slots are all oriented in the same direction.

* * * * *